US012651966B2

(12) United States Patent
Uchida

(10) Patent No.: US 12,651,966 B2
(45) Date of Patent: Jun. 9, 2026

(54) BOOST CIRCUITRY AND BOOST SYSTEM

(71) Applicant: ZEON CORPORATION, Tokyo (JP)

(72) Inventor: Hideki Uchida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 224 days.

(21) Appl. No.: 18/726,769

(22) PCT Filed: Jan. 24, 2023

(86) PCT No.: PCT/JP2023/002146
§ 371 (c)(1),
(2) Date: Jul. 3, 2024

(87) PCT Pub. No.: WO2023/145741
PCT Pub. Date: Aug. 3, 2023

(65) Prior Publication Data
US 2025/0070659 A1     Feb. 27, 2025

(30) Foreign Application Priority Data

Jan. 27, 2022     (JP) ................................ 2022-011320

(51) Int. Cl.
*H02M 3/07*          (2006.01)
*H02M 1/00*          (2006.01)
          (Continued)

(52) U.S. Cl.
CPC ............. *H02M 3/07* (2013.01); *H02M 1/007* (2021.05); *H02M 3/33538* (2013.01); *H02M 7/06* (2013.01)

(58) Field of Classification Search
CPC .. H02M 1/0003; H02M 1/0012; H02M 1/009; H02M 1/0095; H02M 1/08;
          (Continued)

(56) References Cited

U.S. PATENT DOCUMENTS 7,898,223 B2 *   3/2011   Takeda .................... H02M 3/07
                                                    320/167
9,083,187 B2 *   7/2015   Ito ............................ H02J 7/52
                         (Continued)

FOREIGN PATENT DOCUMENTS

JP          2001309643 A      11/2001
JP          2004282800 A      10/2004
                         (Continued)

OTHER PUBLICATIONS

John F. Dickson, On-Chip High-Voltage Generation in MNOS Integrated Circuits Using an Improved Voltage Multiplier Technique, IEEE Journal Of Solid-State Circuits, Jun. 1976, pp. 374-378, vol. 11.

(Continued)

*Primary Examiner* — Thienvu V Tran
*Assistant Examiner* — Shahzeb K Ahmad
(74) *Attorney, Agent, or Firm* — KENJA IP LAW PC

(57)          ABSTRACT

Boost circuitry 20 including: an input 48 configured to input an electrical signal; capacitors 43, 45 connected in parallel configured to store charge pertaining to the electrical signal input; at least one of a switch 44 capable of switching a connection state of the capacitors 43, 45; and a controller 47 configured to control the at least one of the switch 44 to switch the connection state of the capacitors 43, 45 from parallel to series based on an amount of charge of any one of the capacitors 43, 45; and an output 49 configured to output a boosted electrical signal.

9 Claims, 14 Drawing Sheets

(51) Int. Cl.
  *H02M 3/335*        (2006.01)
  *H02M 7/06*         (2006.01)

(58) Field of Classification Search
  CPC .. H02M 1/007; H02M 1/12; H02M 3/07–078;
           H02M 3/155; H02M 3/335; H02M
           3/33538; H02M 7/06; H02M 7/483;
           H02M 7/4837; H01L 41/1134; H01L
                                           41/193
  See application file for complete search history.

(56)                References Cited

U.S. PATENT DOCUMENTS

| | | | | |
|---|---|---|---|---|
| 11,482,878 | B2 * | 10/2022 | Lynds | B60L 3/0046 |
| 2010/0207929 | A1 | 8/2010 | Miyazaki | |
| 2010/0332167 | A1 | 12/2010 | Nuotio et al. | |
| 2012/0200163 | A1 | 8/2012 | Ito et al. | |
| 2013/0154580 | A1 | 6/2013 | Shimizu | |
| 2016/0065059 | A1 | 3/2016 | Ikenaga | |
| 2018/0342949 | A1 * | 11/2018 | Utsunomiya | H02J 7/855 |
| 2020/0252010 | A1 * | 8/2020 | Chiba | H02N 2/181 |
| 2021/0367511 | A1 * | 11/2021 | Liu | H02M 3/01 |
| 2021/0384824 | A1 * | 12/2021 | Mueller | H03K 17/567 |

FOREIGN PATENT DOCUMENTS

| | | |
|---|---|---|
| JP | 2010183710 A | 8/2010 |
| JP | 2016054586 A | 4/2016 |
| JP | 2017017853 A | 1/2017 |
| JP | 2017192168 A | 10/2017 |
| WO | 2011027660 A1 | 3/2011 |
| WO | 2012001810 A1 | 1/2012 |
| WO | WO-2021029427 A1 * | 2/2021 ............... H02J 7/96 |

OTHER PUBLICATIONS

Mar. 7, 2023, International Search Report issued in the International Patent Application No. PCT/JP2023/002146.
Jul. 30, 2024, International Preliminary Report on Patentability issued in the International Patent Application No. PCT/JP2023/002146.

* cited by examiner

<u>1</u>

Time

Time

Time

Time

*FIG. 11*

BOOST CIRCUITRY AND BOOST SYSTEM

TECHNICAL FIELD

The present disclosure relates to boost circuitry and a boost system.

BACKGROUND

Ambient power generation (energy harvesting) is a technology that harvests a small amount of energy, such as heat, light, vibration, or the like, and converts the energy into electrical power. The electrical power output from ambient power generation is typically very small, and is therefore often used for charging secondary cells. Storing a small amount of electrical power directly in a secondary cell is very inefficient, and therefore boosting the voltage is necessary.

Electrical power conversion types of boost circuitry, such as switching regulators, are known as boost circuitry for boosting voltage. In such an electrical power conversion type of boost circuitry, when the input electrical power is small, then even when output voltage can be boosted, current cannot be extracted, and sufficient electrical power cannot be supplied to a subsequent system.

Non-patent literature (NPL) 1 describes a charge pump type of boost circuitry. A charge pump type of boost circuitry stores charge based on input voltage in storage elements such as capacitors connected in parallel, and then boosts the input voltage by switching a connection state of the storage elements to series. The configuration described in NPL 1 uses switching elements that have a high threshold voltage, and therefore cannot switch sufficiently with very little ambient power generation energy.

Patent Literature (PTL) 1 describes a charge pump circuit configuration that performs switching based on a periodically occurring clock signal. The configuration described in PTL 1 can output a stable electrical signal with an almost constant voltage or current value by switching at high speed.

CITATION LIST

Non-Patent Literature

NPL 1: J. Dickson, "On-chip high-voltage generation MNOS integrated circuits using an improved voltage multiplier technique," IEEE J. Solid-State Circuits, vol. SC-11, no. 3, pp. 374-378, June 1976.

Patent Literature

PTL 1: JP 2016-054586 A

SUMMARY

Technical Problem

The configuration described in PTL 1 consumes a large amount of electrical power for switching because the switching of connection state of the storage elements between parallel and series is performed regularly according to a clock signal with a fixed period. In the configuration described in PTL 1, increasing the frequency of switching results in the output electrical signal becoming a more stable signal with smaller fluctuations. However, as switching frequency is increased, power consumption required for switching increases. Therefore, when the configuration described in PTL 1 is applied to ambient power generation, most of the electrical power generated may be consumed by switching, leaving little electrical power remaining to be stored in a secondary cell. Thus, conventional configurations left room for improvement in terms of efficient use of electrical power when applied to ambient power generation that outputs a small amount of energy.

It would be helpful to provide boost circuitry and a boost system capable of utilizing input electrical power more efficiently to boost voltage.

Solution to Problem

Boost circuitry according to an embodiment comprises:
(1) an input configured to input an electrical signal; capacitors connected in parallel configured to store charge pertaining to the electrical signal inputted; at least one switch capable of switching a connection state of the capacitors; and a controller configured to control the at least one switch to switch the connection state of the capacitors from parallel to series based on an amount of charge of any one of the capacitors; and an output configured to output a boosted electrical signal in response to the connection state of the capacitors being switched from parallel to series. Thus, the boost circuitry switches the connection state of the capacitors from parallel to series based on an amount of charge of any one of the capacitors connected in parallel. Therefore, according to the boost circuitry, electrical power input according to power generation by a power source may be used more efficiently.
(2) In the boost circuitry according to (1), the output may be configured to output a pulsed electrical signal as the boosted electrical signal. According to this configuration, a desired load is operable by a pulsed electrical signal while greatly suppressing electrical power loss due to switching.
(3) In the boost circuitry according to (1) or (2), the controller may be configured to control the at least one switch to switch the connection state of the capacitors from parallel to series in response to voltage between plates of any one of the capacitors reaching or exceeding a predetermined first threshold value. Thus, the boost circuitry switches the connection state of the capacitors to series in response to the voltage between plates of any one of the capacitors reaching or exceeding the predetermined first threshold value. Therefore, according to the boost circuitry, voltage can be boosted appropriately in response to intermittent electrical power input.
(4) In the boost circuitry according to (3), the controller may be configured to, when the capacitors are connected in series, control the at least one switch to switch the connection state of the capacitors from series to parallel in response to the voltage between plates of any one of the capacitors becoming less than a predetermined second threshold value that is smaller than the first threshold value. Thus, the boost circuitry switches the connection state of the capacitors in parallel in response to the voltage between plates of any one of the capacitors becoming less than the predetermined second threshold value. Therefore, according to the boost circuitry, the connection state of the capacitors can be automatically restored to series in response to completion of output of boosted voltage.
(5) In the boost circuitry according to (4), the first threshold value and the second threshold value may be values determined based on an amount of charge input by the electrical signal input from the input and a desired time interval of switching the at least one switch. According to this configuration, boosted electrical signals may be output at a desired time interval while greatly suppressing electrical power loss due to switching.

(6) The boost circuitry according to any one of (1) to (5) may further comprise a boost circuit provided before the capacitors and configured to boost the electrical signal input. According to this configuration, even when voltage of an input electrical signal is very weak, voltage boosting can be performed by switching the connection state of the capacitors.

(7) The boost circuitry according to any of (1) to (6) may further comprise resistors connected in series to the capacitors.

(8) In the boost circuitry according to (7), the capacitors and the resistors may be connected in parallel to input terminals for an electrical signal input from an electrical power generation element; and the resistors may have resistance values selected based on an I-V curve characteristic of the electrical power generation element. According to this configuration, output electrical power can be maximized according to the I-V curve characteristic of the electrical power generation element.

A boost system according to an embodiment comprises:

(9) an electrical power generation element configured for ambient power generation; the boost circuitry according to any of (1) to (8); a storage element configured to store electrical power generated by the electrical power generation element and boosted by the boost circuitry; and a load configured to operate based on electrical power stored in the storage element. According to this configuration, a load can be operated in response to electrical power generated by the electrical power generation element pertaining to a power source.

(10) In the boost system according to (9), the load may be configured to operate based on a boosted pulsed electrical signal in response to output of the boosted pulsed electrical signal from the boost circuitry due to the controller switching the connection state of the capacitors from parallel to series. According to this configuration, a load may be operated efficiently while greatly suppressing electrical power loss due to switching.

Advantageous Effect

According to an embodiment of the present disclosure, input electrical power is utilized more efficiently to boost voltage.

BRIEF DESCRIPTION OF THE DRAWINGS

In the accompanying drawings:

FIG. 11 is a diagram schematically illustrating voltage and current output over time by the interface circuitry in FIG. 1.

DETAILED DESCRIPTION

Embodiments of the present disclosure are described below with reference to the drawings. In each drawing, parts having the same configuration or function are marked with the same reference sign. In description of the embodiments, duplicate descriptions of identical parts may be omitted or simplified as appropriate.

The configuration according to the present disclosure boosts input voltage in a charge pump type of boost circuitry by switching a connection state of capacitors between parallel and series only when there is electrical power input, instead of switching the connection state of capacitors between parallel and series regularly at a constant frequency. Therefore, when the configuration according to the present disclosure is applied to ambient power generation that intermittently generates small amounts of electrical power, the electrical power is efficiently utilizable.

(Boost System)

Figure 1:
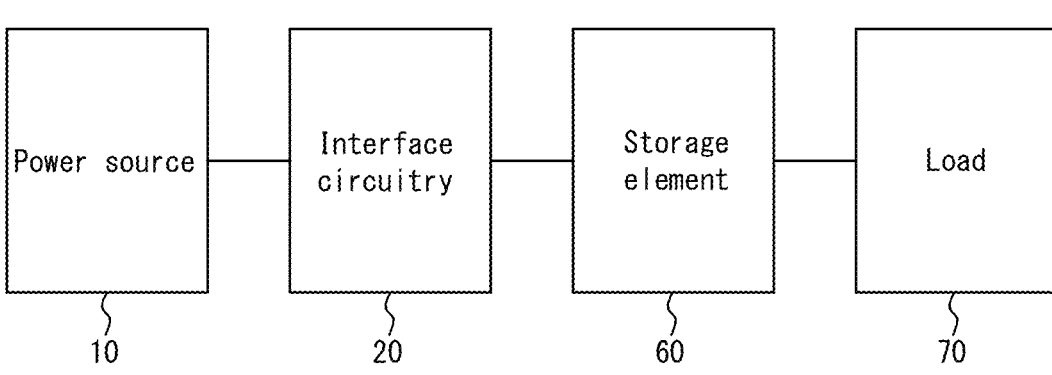
FIG. 1 is a diagram illustrating an example configuration of a boost system according to an embodiment of the present disclosure.

FIG. 1 is a diagram illustrating an example configuration of a boost system 1 according to an embodiment of the present disclosure. The boost system 1 includes a power source 10, interface circuitry 20, a storage element 60, and a load 70.

The power source 10 is an electrical power generation element that generates electricity based on ambient energy, such as heat, light, vibration, or the like. The power source 10 may be, for example, a thermoelectric conversion element, a photoelectric conversion element, a vibration power generation element, or the like. The following describes an example in which the power source 10 generates electrical power intermittently, but the power source 10 may generate a constant amount of electrical power on a regular basis. The power source 10 outputs generated electrical signals to the interface circuitry 20.

The interface circuitry 20 as the boost circuitry according to the present embodiment is circuitry that boosts an electrical signal output from the power source 10. The interface circuitry 20 outputs a boosted electrical signal to the storage element 60. Details of the interface circuitry 20 are described below with reference to FIG. 2 through FIG. 4.

The storage element 60 is an element that stores electrical power of an electrical signal boosted in the interface circuitry 20. The storage element 60 is, for example, a battery such as a lithium ion battery, a capacitor such as an electric double layer capacitor (super capacitor), or any other element capable of storing electrical power.

The load 70 is any electrical circuit operable based on electrical power stored in the storage element 60. For example, the load 70 may be a circuit for realizing an Internet of things (IoT) function that transmits data such as a physical quantity detected by a sensor through wireless communication, such as Bluetooth® (Bluetooth is a registered trademark in Japan, other countries, or both). When the load 70 is configured as a circuit that enables such IoT functionality, a plurality of the boost system 1 may be disposed in a measurement area to transmit and receive data detected in each boost system 1, in response to ambient energy being obtained. The load 70 is not limited to circuits that enable such IoT functionality.

Figure 2:
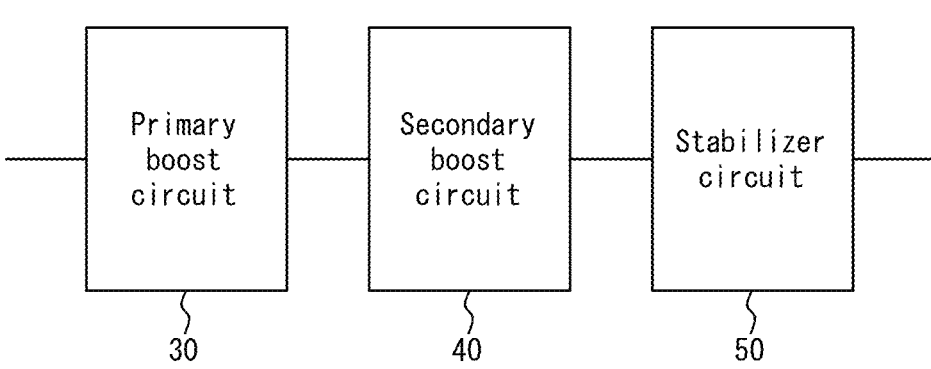
FIG. 2 is a diagram illustrating an example configuration of the interface circuitry in FIG. 1.

FIG. 2 is a diagram illustrating an example configuration of the interface circuitry 20 in FIG. 1. The interface circuitry 20 includes a primary boost circuit 30, a secondary boost circuit 40, and a stabilizer circuit 50.

The primary boost circuit 30 is a boost circuit that boosts an electrical signal output from the power source 10 before the secondary boost circuit 40. In addition to electrical power stored in the storage element 60, an electrical signal output by the primary boost circuit 30 may be used for switching in the charge pump circuit of the secondary boost circuit 40, and may be used for operating the stabilizer circuit 50. According to the present embodiment, the primary boost circuit 30 boosts an input electrical signal via a transformer, but the primary boost circuit 30 may boost voltage by other configurations instead of a transformer. The primary boost circuit 30 outputs a boosted electrical signal to the secondary boost circuit 40. Details of the primary boost circuit 30 are described below with reference to FIG. 3.

The secondary boost circuit 40 boosts an input electrical signal via a charge pump circuit. According to the present embodiment, the secondary boost circuit 40 switches a connection state of capacitors between parallel and series only when an electrical signal is input from the power source 10, and therefore input electrical power may be used more efficiently. The secondary boost circuit 40 outputs a boosted electrical signal to the stabilizer circuit 50. Details of secondary boost circuit 40 are described below with reference to FIG. 4.

The stabilizer circuit 50 is a circuit for stabilizing an electrical signal output by the secondary boost circuit 40. The stabilizer circuit 50 may be realized, for example, by a buck-boost converter. The stabilizer circuit 50 outputs a stabilized electrical signal to the storage element 60. Details of the stabilizer circuit 50 are described below with reference to FIG. 4.

Figure 3:
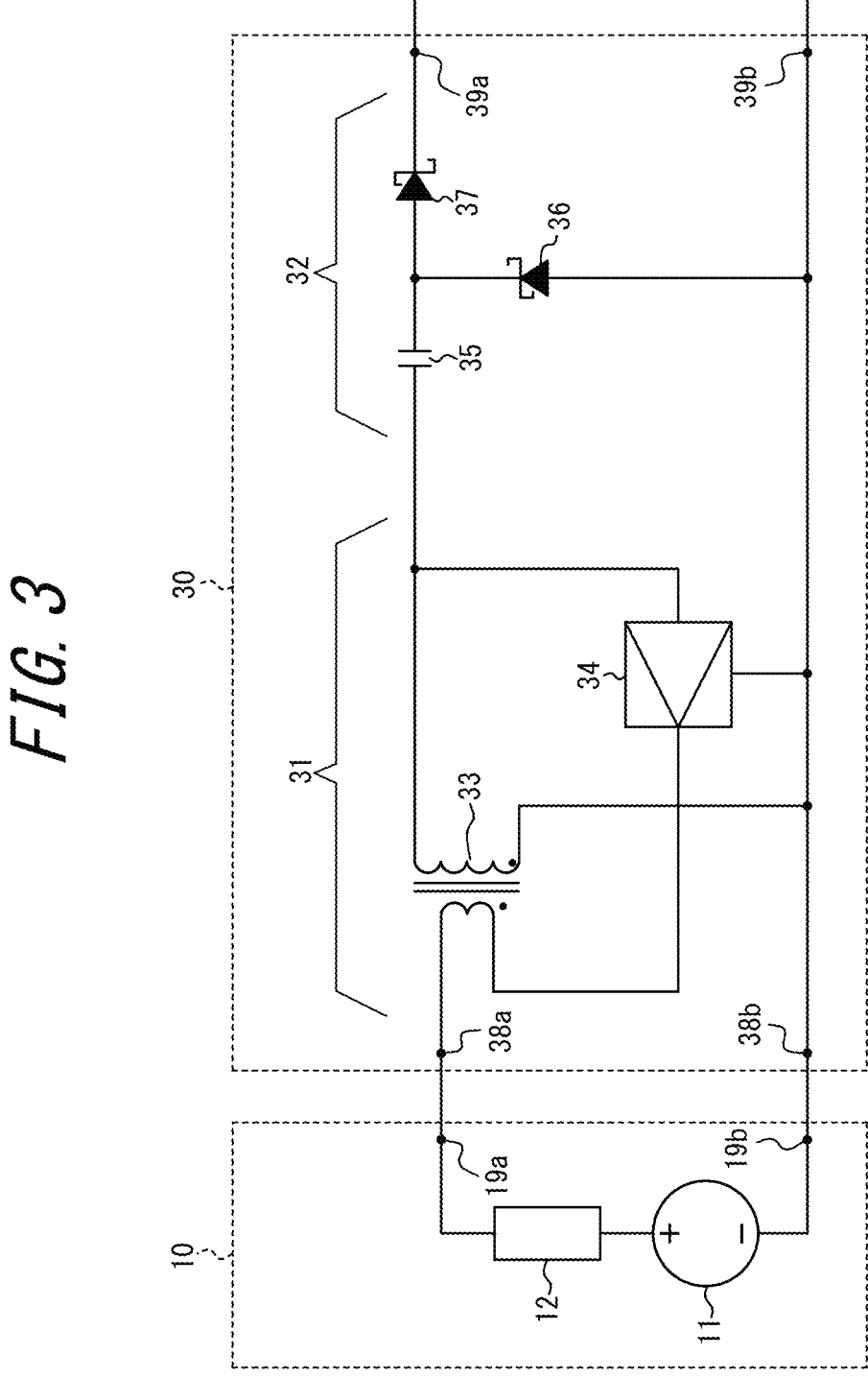
FIG. 3 is a diagram illustrating an example configuration of the power source in FIG. 1 and the primary boost circuit in FIG. 2.

FIG. 3 is a diagram illustrating an example configuration of the power source 10 in FIG. 1 and the primary boost circuit 30 in FIG. 2. As illustrated in FIG. 3, the power source 10 includes a voltage supply 11, a resistor 12, and an output 19 (19a, 19b).

The voltage supply 11 is a voltage source provided by the electrical power generation element pertaining to the power source 10. According to the present embodiment, the voltage supply 11 supplies voltage intermittently. The resistor 12 is an internal resistor of the power source 10. The power source 10 outputs an electrical signal generated by power generation to the primary boost circuit 30 via the output 19 (19a, 19b).

The primary boost circuit 30 includes an oscillator 31, a rectifier 32, an input 38 (38a, 38b), and an output 39 (39a, 39b). The oscillator 31 boosts an electrical signal input from the power source 10 via the input 38 (38a, 38b). In the example in FIG. 3, the oscillator 31 includes a transformer 33 and a transistor 34. FIG. 3 illustrates an example of the oscillator 31 configured as a blocking oscillation circuit, but configuration of the oscillator 31 is not limited to this example.

The transformer 33 is a transformer in which primary and secondary coils are wound around a core, such as an iron core. The transformer transforms according to a ratio of the number of turns of the primary and secondary coils. For example, when the ratio of the number of turns of the primary and secondary coils is 1:50, voltage of an input electrical signal can be boosted 50 times. The ratio of the numbers of turns of the primary and secondary coils in the transformer 33 is not limited to 1:50. The transistor 34 is used to make the oscillator 31 function as a feedback oscillation circuit using an amplifying action. The oscillator 31 outputs a boosted electrical signal to the rectifier 32.

The rectifier 32 includes a capacitor 35 and diodes 36, 37. The rectifier 32 converts an AC signal to a DC signal by causing an electrical signal input from the oscillator 31 to flow in only one direction. In the example in FIG. 3, the rectifier 32 has a configuration of performing single-phase half-wave rectification, but the rectifier 32 may be configured to perform other forms of rectification such as two-phase full-wave rectification, single-phase bridge rectification, or the like. The rectifier 32 outputs an electrical signal that has been rectified to the secondary boost circuit 40 via the output 39 (39a, 39b).

Figure 4:
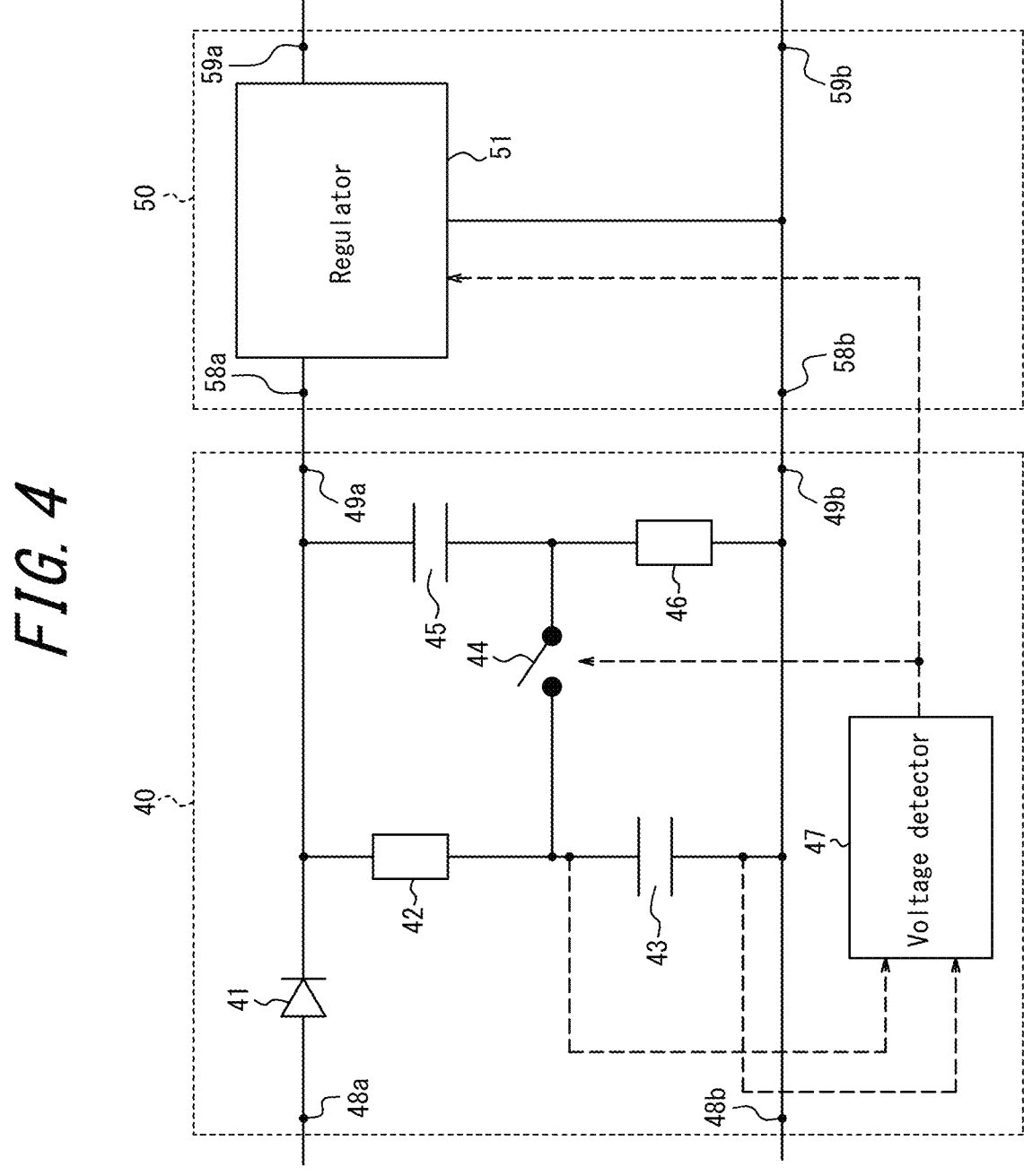
FIG. 4 is a diagram illustrating an example configuration of the secondary boost circuit and stabilizer circuit in FIG. 2.

FIG. 4 is a diagram illustrating an example configuration of the secondary boost circuit 40 and the stabilizer circuit 50 in FIG. 2. The secondary boost circuit 40 includes a diode 41, a resistor 42, a capacitor 43, a switch 44, a capacitor 45, a resistor 46, a voltage detector 47, an input 48 (48a, 48b), and an output 49 (49a, 49b).

The diode 41 acts as a rectifier that rectifies an electrical signal input via the input 48 (48a, 48b). When the primary boost circuit 30 includes the rectifier 32, as illustrated in FIG. 3, the secondary boost circuit 40 does not need to include the diode 41.

The resistor 42, the capacitor 43, the switch 44, the capacitor 45, and the resistor 46 constitute a charge pump circuit. When the switch 44 disconnects the electrical circuit, the circuit consisting of the resistor 42 and the capacitor 43 is connected in parallel with the circuit consisting of the capacitor 45 and the resistor 46. When an electrical signal is input via the diode 41 in this situation, charge is stored in the capacitors 43, 45. While charge is stored in the capacitors 43, 45, when the switch 44 connects the electrical circuit, the capacitors 43, 45 are connected in series to provide a large voltage. Thus, the secondary boost circuit 40 boosts an input electrical signal by storage in capacitors connected in parallel followed by connection of the capacitors in series.

The voltage detector 47 as the controller of the present embodiment measures voltage across the terminals of the capacitor 43 and switches the connection of the switch 44 based on charge rate of the capacitor 43. That is, the voltage detector 47 measures the charge rate of the capacitor 43 based on voltage across the terminals of the capacitor 43 while the switch 44 is in a disconnected state. Upon detecting that the charge rate of the capacitor 43 is a predetermined first threshold value or more, the voltage detector 47 controls the switch 44 to connect. This switches the connection of the capacitors 43, 45 from parallel to series. Subsequently, upon detecting that the charge rate of the capacitor 43 is less than a predetermined second threshold value (less than the first threshold value), the voltage detector 47 controls the switch 44 to disconnect. Accordingly, the connection state of the capacitors 43, 45 is switched from series to parallel. Subsequently, when the charge rate of the capacitor 43 is again detected to be the predetermined first threshold value or more, the voltage detector 47 controls the switch 44 to connect. Thus, the voltage detector 47 compares the magnitude of the charge rate of the capacitor 43 with the first threshold value and the second threshold value, and switches the switch 44 to connect and disconnect based on a result of the comparison. Accordingly, in response to input of an electrical signal, the secondary boost circuit 40 is able to boost the electrical signal.

The second threshold value may be smaller than or equal to the first threshold value. The charge rate of the capacitor 43 is proportional to the voltage across the terminals of the capacitor 43. Therefore, instead of the charge rate of the capacitor 43, the voltage detector 47 may compare the voltage across the terminals of the capacitor 43 or the total charge in the capacitor 43 with a defined threshold value to switch connection and disconnection of the switch 44.

The voltage detector 47 outputs information on the state of the connection of the switch 44 and the voltage across the terminals of capacitor 43 to a regulator 51. The secondary boost circuit 40 outputs a boosted electrical signal to the stabilizer circuit 50 via the output 49 (49a, 49b).

The stabilizer circuit 50 includes the regulator 51, an input 58 (58a, 58b), and an output 59 (59a, 59b). The regulator 51 stabilizes an electrical signal input via the input 58 (58a, 58b) and outputs the electrical signal as a near constant voltage or current signal. The regulator 51 may be realized by, for example, a buck-boost converter, or by any other configuration. The regulator 51 may perform stabilization using information on the state of the connection of the switch 44 and the voltage across the terminals of the capacitor 43 input from the voltage detector 47. The switch 44, the voltage detector 47, the regulator 51, and the like are operated by electrical power of the electrical signal input. The stabilizer circuit 50 outputs a stabilized electrical signal to the storage element 60 via the output 59 (59a, 59b).

As described above, the interface circuitry 20 as the boost circuitry according to the present embodiment includes the capacitors 43, 45, at least one of the switch 44, and the voltage detector 47. The capacitors 43, 45 are connected in parallel. At least one of the switch 44 can switch the connection state of the capacitors 43, 45. The voltage detector 47 controls at least one of the switch 44 to switch the connection state of the capacitors 43, 45 from parallel to series based on an amount of charge of any one of the capacitors 43, 45 (for example, the capacitor 43). Thus, the interface circuitry 20 switches the connection state of the capacitors 43, 45 from parallel to series based on an amount of charge of any one of the capacitors 43, 45 connected in parallel. Therefore, according to the interface circuitry 20, electrical power input according to power generation by the power source 10 may be used more efficiently.

FIG. 4 illustrates an example of the interface circuitry 20 including the two capacitors 43, 45 connected in parallel, but the interface circuitry 20 may include three or more capacitors connected in parallel. The interface circuitry 20 may include more than one switch. The interface circuitry 20 includes three or more capacitors connected in parallel and can boost input voltage to a higher voltage by switching the connection state of the capacitors from parallel to series based on an amount of charge in any one of the capacitors.

The voltage detector 47 may control at least one of the switch 44 to switch the connection state of the capacitors 43, 45 from parallel to series in response to voltage between plates of any one of the capacitors 43, 45 reaching or exceeding the predetermined first threshold value. The voltage detector 47, when the capacitors 43, 45 are connected in series, may control at least one of the switch 44 to switch the connection state of the capacitors 43, 45 from series to parallel in response to the voltage between plates of any one of the capacitors 43, 45 becoming less than the predetermined second threshold value. Here, the second threshold value may be smaller than the first threshold value. The voltage between plates of a capacitor is proportional to the amount of charge charged in the capacitor. Therefore, the voltage detector 47 compares the voltage between plates of any one of the capacitors 43, 45 with a predetermined threshold value to switch the connection state of the capacitors 43, 45. Accordingly, even when electrical power supply is intermittent, based on ambient power generation, rather than being supplied on a regular basis, the interface circuitry 20 is able to efficiently use an input electrical signal to boost voltage.

Figure 5A:
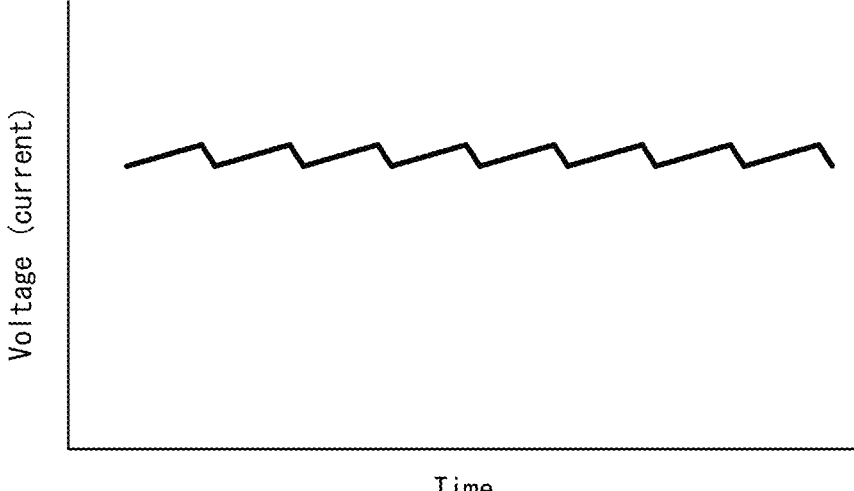
FIG. 5A is a diagram schematically illustrating voltage (current) output over time by boost circuitry according to a comparative example.
Figure 5B:
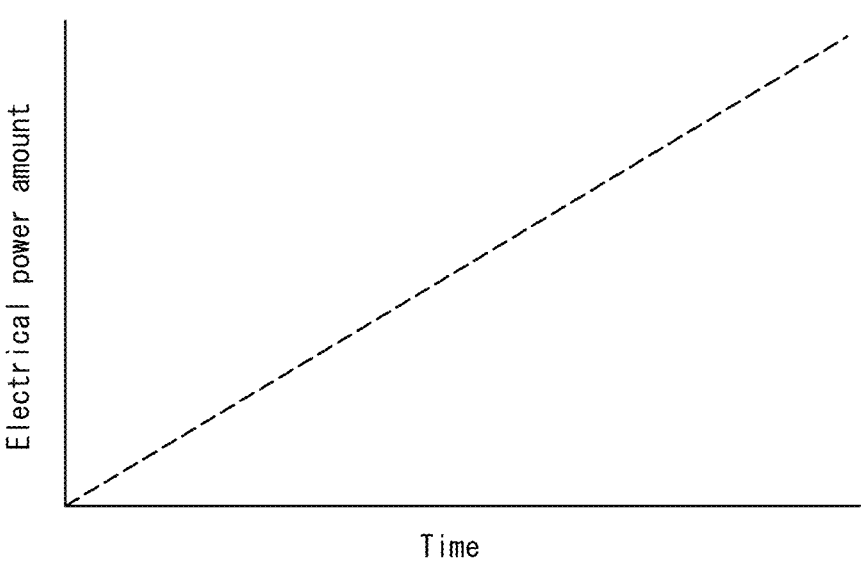
FIG. 5B is a diagram schematically illustrating amount of electrical power over time in a storage element that stores electrical power output by the boost circuitry according to a comparative example.
Figures 6A, 6B:
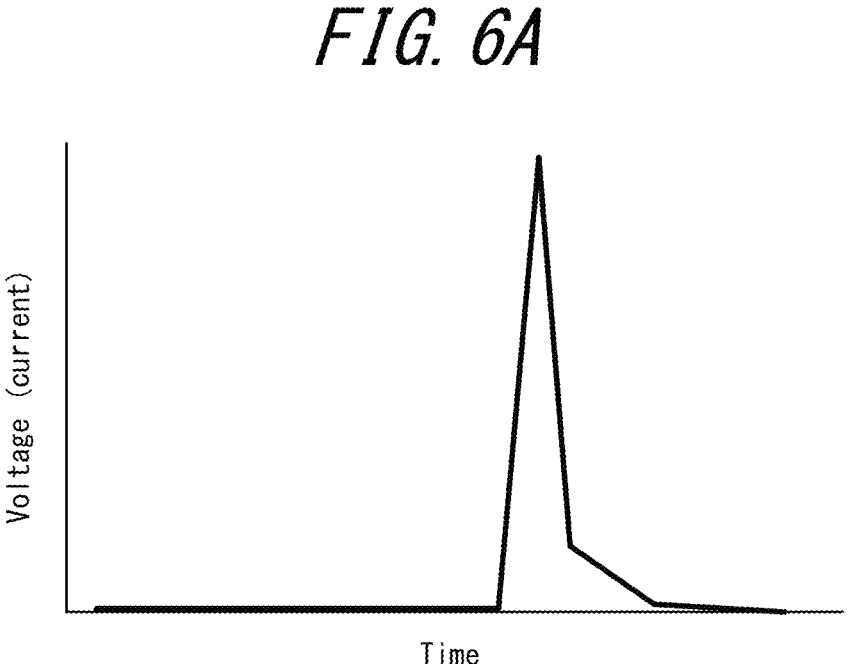
FIG. 6A is a diagram schematically illustrating voltage (current) output over time by the interface circuitry in FIG. 1.
FIG. 6B is a diagram schematically illustrating amount of electrical power over time in a storage element that stores electrical power output by the interface circuitry in FIG. 1.

FIG. 5A is a diagram schematically illustrating voltage (current) output over time by boost circuitry according to a comparative example. FIG. 5B is a diagram schematically illustrating amount of electrical power over time in a storage element that stores electrical power output by the boost circuitry according to the comparative example. FIG. 6A is a diagram schematically illustrating voltage (current) output over time by the interface circuitry 20 in FIG. 1. FIG. 6B is a diagram schematically illustrating amount of electrical power over time in the storage element 60 that stores electrical power output by the interface circuitry 20 in FIG. 1.

FIG. 5A and FIG. 5B illustrate operation when switching the connection state of capacitors between parallel and series is performed regularly according to a clock signal with a fixed period, as in the configuration described in PTL 1. As illustrated in FIG. 5A, in the comparative example, by making the switching frequency sufficiently frequent, output voltage (or current) becomes a nearly constant DC signal. As illustrated in FIG. 5B, an amount of electrical power in the storage element that stores electrical power output by the boost circuitry of such a comparative example rises proportionally over time.

FIG. 6A and FIG. 6B illustrate operation of the interface circuitry 20 according to the present embodiment in a case of intermittent electrical power supply based on ambient power generation. As illustrated in FIG. 6A, the interface circuitry 20 according to the present embodiment outputs a boosted electrical signal in response to electrical power supplied intermittently from the power source 10. When the load 70 operates only when electrical power is intermittently supplied from the power source 10, an amount of electrical power stored by the storage element 60 is immediately consumed. Accordingly, as illustrated in FIG. 6B, when the load 70 operates as such, a change in the amount of electrical power in the storage element 60 is similar to a change in output voltage (current) of the interface circuitry 20 illustrated in FIG. 6A.

As illustrated in FIG. 5A and FIG. 5B, switching of a connection state of capacitors between parallel and series is required to be performed regularly according to a fixed period clock signal, regardless of whether electrical power is supplied or not. Accordingly, the configuration according to the comparative example cannot be made to operate in situations where a weak electrical power supply is intermittently provided based on ambient power generation.

In contrast, the interface circuitry 20 according to the present embodiment does not require a regular electrical power supply. When the interface circuitry 20 receives an intermittent electrical power input from the power source 10, the voltage detector 47 and the like operate accordingly to switch the connection state of the capacitors 43, 45 and boost the input electrical signal. Accordingly, even in situations where a weak electrical power supply is intermittently provided based on ambient power generation, the interface circuitry 20 according to the present embodiment is able to efficiently utilize the electrical power and cause operation of electric circuitry pertaining to the load 70.

The interface circuitry 20 includes the primary boost circuit 30 before the secondary boost circuit 40, which includes the capacitors 43, 45 connected in parallel. The primary boost circuit 30 boosts an input electrical signal via the transformer 33. As mentioned above, the switch 44 and the voltage detector 47 of the secondary boost circuit 40, as well as the regulator 51 of the stabilizer circuit 50 and the like, are operated by electrical power of an input electrical signal. When voltage of an electrical signal output by the power source 10 is very low, operating the switch 44, the voltage detector 47, the regulator 51, and the like with the electrical signal might not be possible. The interface circuitry 20 according to the present embodiment includes the primary boost circuit 30 before the secondary boost circuit 40 and boosts the electrical signal from the power source 10 before supplying to the secondary boost circuit 40. Therefore, even when the electrical signal from the power source 10 is very weak, voltage can be boosted by the secondary boost circuit 40.

The interface circuitry 20 in FIG. 2 includes the primary boost circuit 30, the secondary boost circuit 40, and the stabilizer circuit 50, but may be configured without at least one of the primary boost circuit 30 or the secondary boost circuit 40, depending on the magnitude of the voltage of the electrical signal from the power source 10. The magnitude of the voltage of the electrical signal from the power source 10 is determined, for example, by the type of power generation system that realizes the power source 10. FIG. 7A through FIG. 7D illustrate example configurations of the boost system 1 in FIG. 1.

Figure 7A:
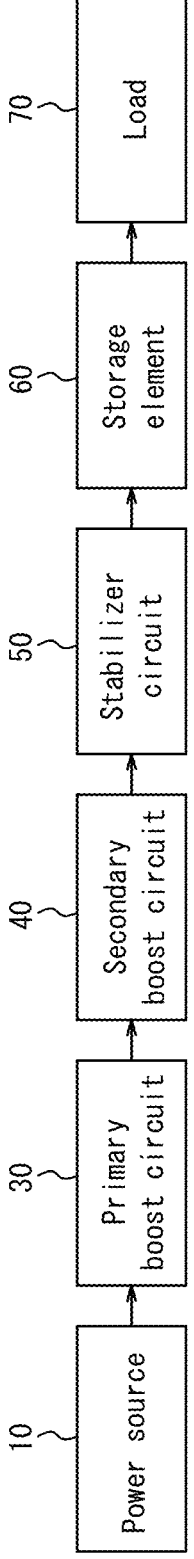
FIG. 7A is a diagram illustrating an example of an electrical signal transmission path in the boost system in FIG. 1.

FIG. 7A illustrates an example where the electrical signal from the power source 10 is stored in the storage element 60 via the primary boost circuit 30, the secondary boost circuit 40, and the stabilizer circuit 50. When the voltage of the electrical signal output by the power source 10 is very weak, the electrical signal of the power source 10 needs to be significantly boosted in order to operate the circuitry pertaining to the load 70. Therefore, when the voltage of the electrical signal of the power source 10 is very small, the interface circuitry 20 may include both the primary boost circuit 30 and the secondary boost circuit 40 to provide a two-step voltage boost for the electrical signal of the power source 10.

Figure 7B:
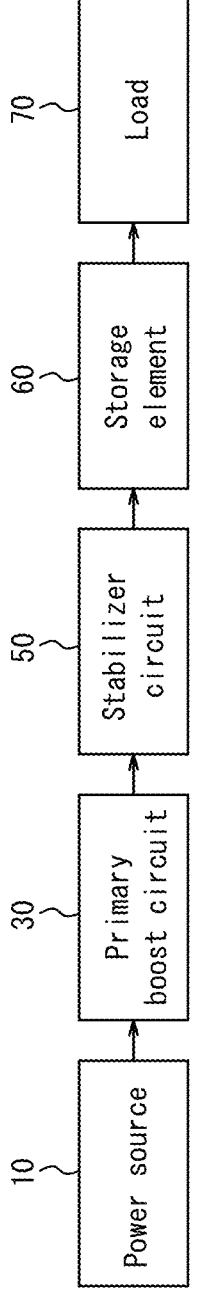
FIG. 7B is a diagram illustrating an example of an electrical signal transmission path in the boost system in FIG. 1.

FIG. 7B illustrates an example where the electrical signal from the power source 10 is stored in the storage element 60 via the primary boost circuit 30 and the stabilizer circuit 50. When the voltage of the electrical signal output by the power source 10 is a value that allows the circuitry pertaining to the load 70 to be operated only by boosting by the primary boost circuit 30, the interface circuitry 20 need not include the secondary boost circuit 40 and may boost the voltage by only the primary boost circuit 30.

Figure 7C:
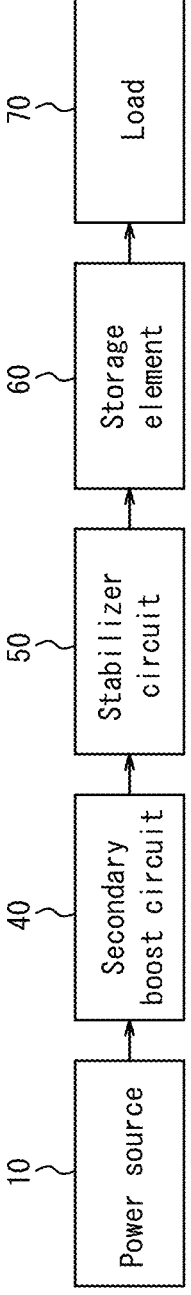
FIG. 7C is a diagram illustrating an example of an electrical signal transmission path in the boost system in FIG. 1.

FIG. 7C illustrates an example where the electrical signal from the power source 10 is stored in the storage element 60 via the secondary boost circuit 40 and the stabilizer circuit 50. When the voltage of the electrical signal output by the power source 10 is a value that allows the secondary boost circuit 40 to operate without prior boosting and allows the circuitry pertaining to the load 70 to be operated only by boosting by the secondary boost circuit 40, the interface circuitry 20 need not include the primary boost circuit 30 and may boost the voltage by only the secondary boost circuit 40.

Figure 7D:
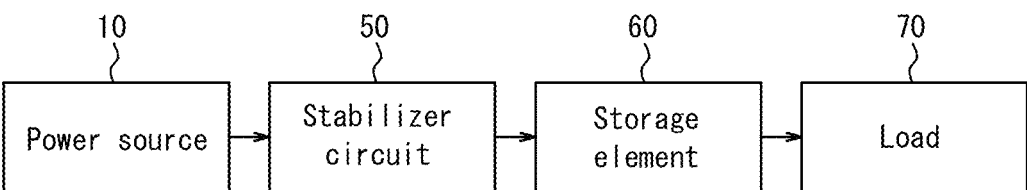
FIG. 7D is a diagram illustrating an example of an electrical signal transmission path in the boost system in FIG. 1.

FIG. 7D illustrates an example where the electrical signal from the power source 10 is stored in the storage element 60 via the stabilizer circuit 50, without a boost. When the voltage of the electrical signal output by the power source 10 is a value that allows the circuitry pertaining to the load 70 to operate without a boost, the interface circuitry 20 need not include the primary boost circuit 30 or the secondary boost circuit 40.

Figure 8A:
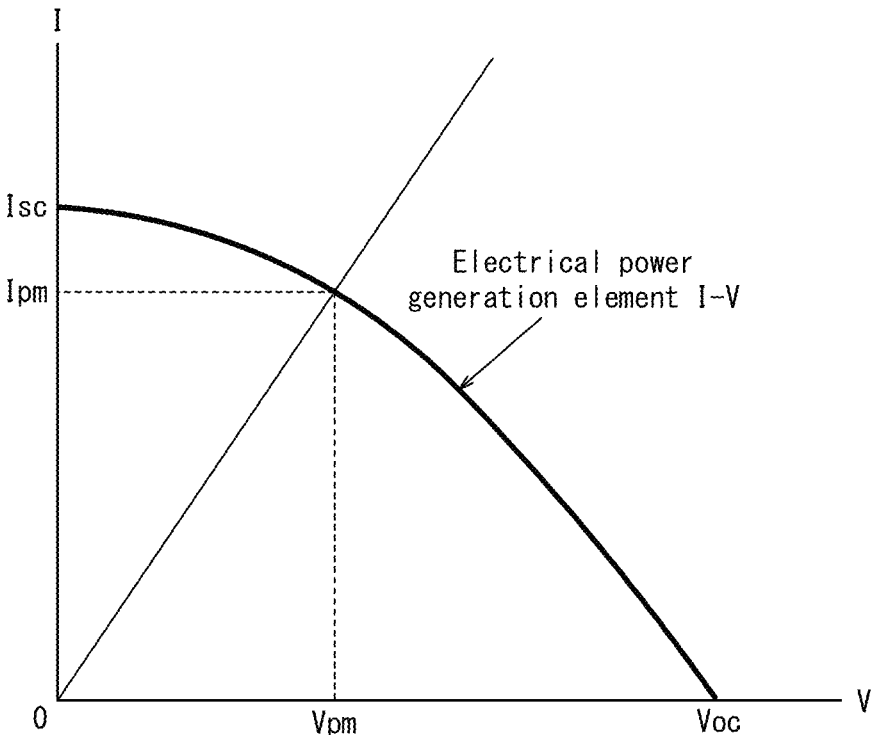
FIG. 8A is a schematic diagram illustrating an example of a method for determining values of resistors in the secondary boost circuit in FIG. 4.
Figure 8B:
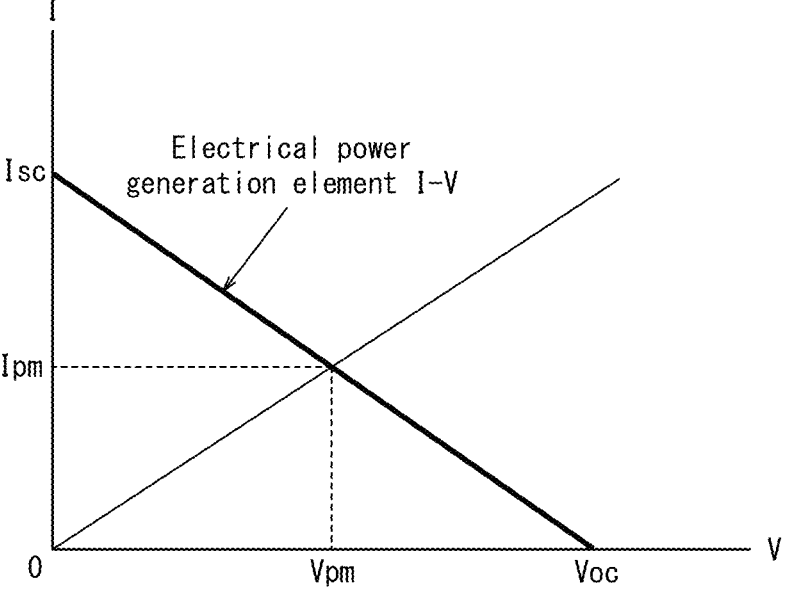
FIG. 8B is a schematic diagram illustrating an example of a method for determining values of resistors in the secondary boost circuit in FIG. 4.

As illustrated in FIG. 4, the interface circuitry 20 includes the resistors 42, 46 connected in series with the capacitors 43, 45. The resistors 42, 46 are determined in order to maximize output electrical power based on the current-voltage (I-V) curve characteristics of the power source 10. FIG. 8A and FIG. 8B are schematic diagrams illustrating examples of methods for determining values of the resistors 42, 46 in the secondary boost circuit 40 in FIG. 4.

FIG. 8A illustrates an I-V curve of an electrical power generation element of the power source 10, with the horizontal axis as voltage and the vertical axis as current. The I-V curve illustrated in FIG. 8A is a convex curve with Voc as the open circuit voltage and Isc as the short circuit current. Output electrical power is given as voltage×current among the points on the I-V curve. Therefore, when the combination of voltage and current that maximizes output electrical power is (voltage, current)=(Vpm, Ipm), then Ipm×Vpm is equal to the maximum area of a rectangle for which each edge inscribed in the V axis, I axis, and I-V curve is parallel to the V axis or the I axis. In FIG. 8A, the slope of the line passing through (0, 0) and (Vpm, Ipm), (Ipm/Vpm), is the reciprocal of the resistance value of the circuit with the maximum output electrical power. Therefore, the resistance values of the resistors 42, 46 may be selected so that a value of combined resistance is Vpm/Ipm, based on the I-V curve of the electrical power generation element of the power source 10, in order to maximize output electrical power.

FIG. 8B illustrates a case where an I-V curve of an electrical power generation element of the power source 10 is represented by a straight line, with the horizontal axis as voltage and the vertical axis as current. In this case, the combination of voltage and current that maximizes output electrical power is (voltage, current)=(Vpm, Ipm)=(Voc/2, Isc/2). Therefore, the resistance values of the resistors 42, 46 may be selected so that a value of combined resistance is Voc/Isc, in order to maximize output electrical power. In the example in FIG. 4, the interface circuitry 20 includes the two capacitors 43, 45 and the two resistors 42, 46. Alternatively, the interface circuitry 20 may be configured to include three or more sets connected in parallel, each set including a capacitor and a resistor connected in series. Thus, the capacitors 43, 45 and the resistors 42, 46 may be connected in parallel to input terminals for an electrical signal input from an electrical power generation element. Here, the resistors 42, 46 may have resistance values selected based on an I-V curve characteristic of the electrical power generation element. Therefore, the interface circuitry 20 is able to maximize output voltage based on electrical power generated by an electrical power generation element of the power source 10.

The boost system 1 includes the power source 10, the interface circuitry 20, the storage element 60, and the load 70. The power source 10 includes an electrical power generation element for ambient power generation. The storage element 60 stores electrical power generated by an electrical power generation element of the power source 10 and boosted by the interface circuitry 20. The load 70 operates based on electrical power stored in the storage element 60. Accordingly, the boost system 1 can operate the load 70 in response to intermittent power generation by an electrical power generation element of the power source 10.

Figure 9:
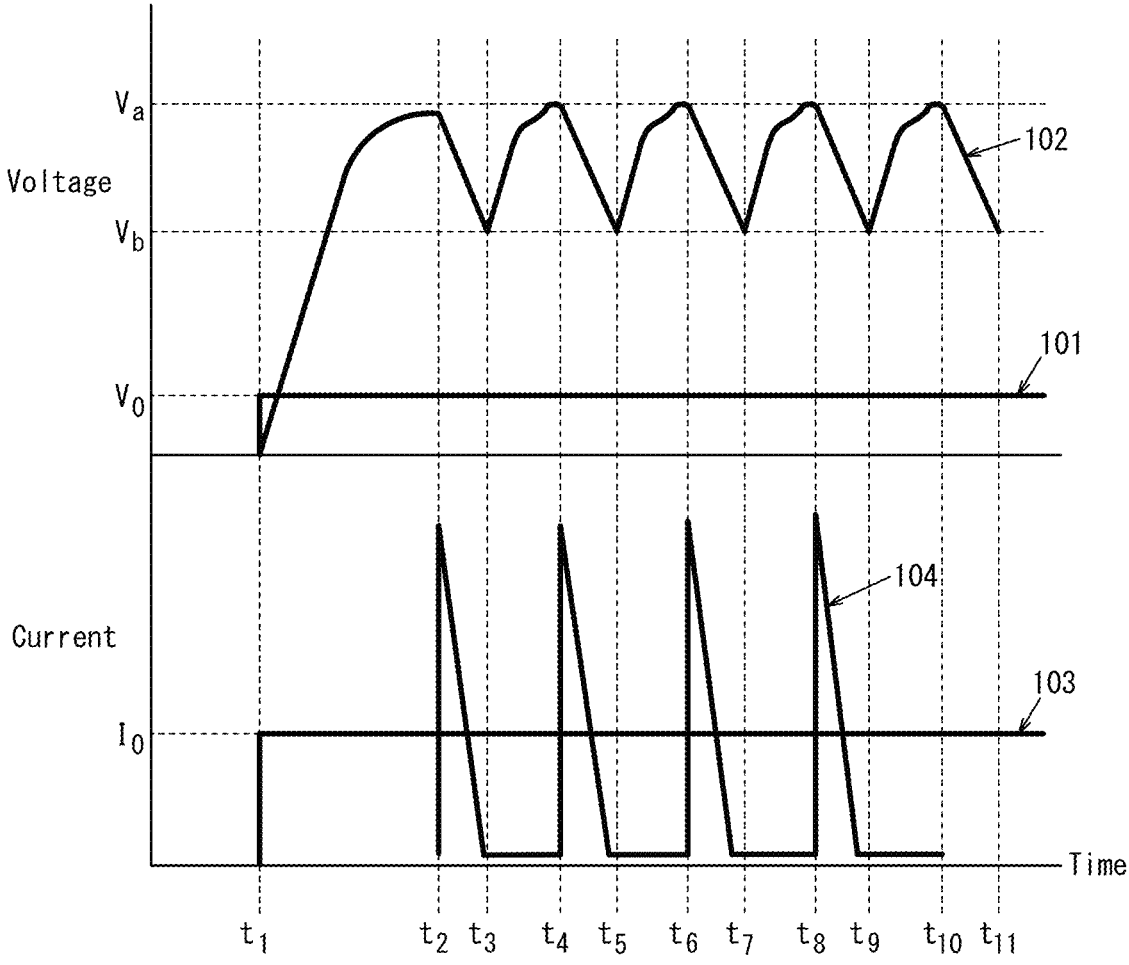
FIG. 9 is a diagram schematically illustrating voltage and current output over time by boost circuitry according to a comparative example.
Figure 10:
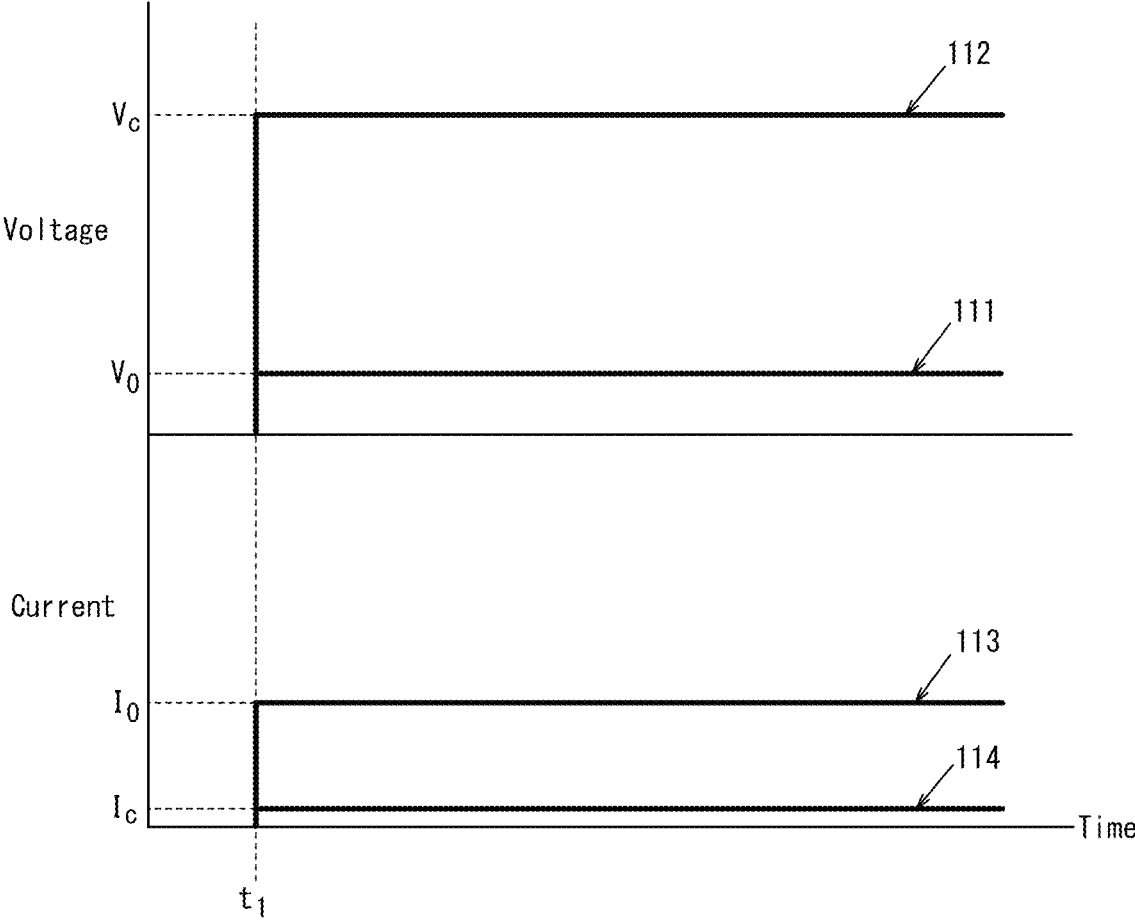
FIG. 10 is a diagram schematically illustrating voltage and current output over time by boost circuitry according to a comparative example.
Figure 11:
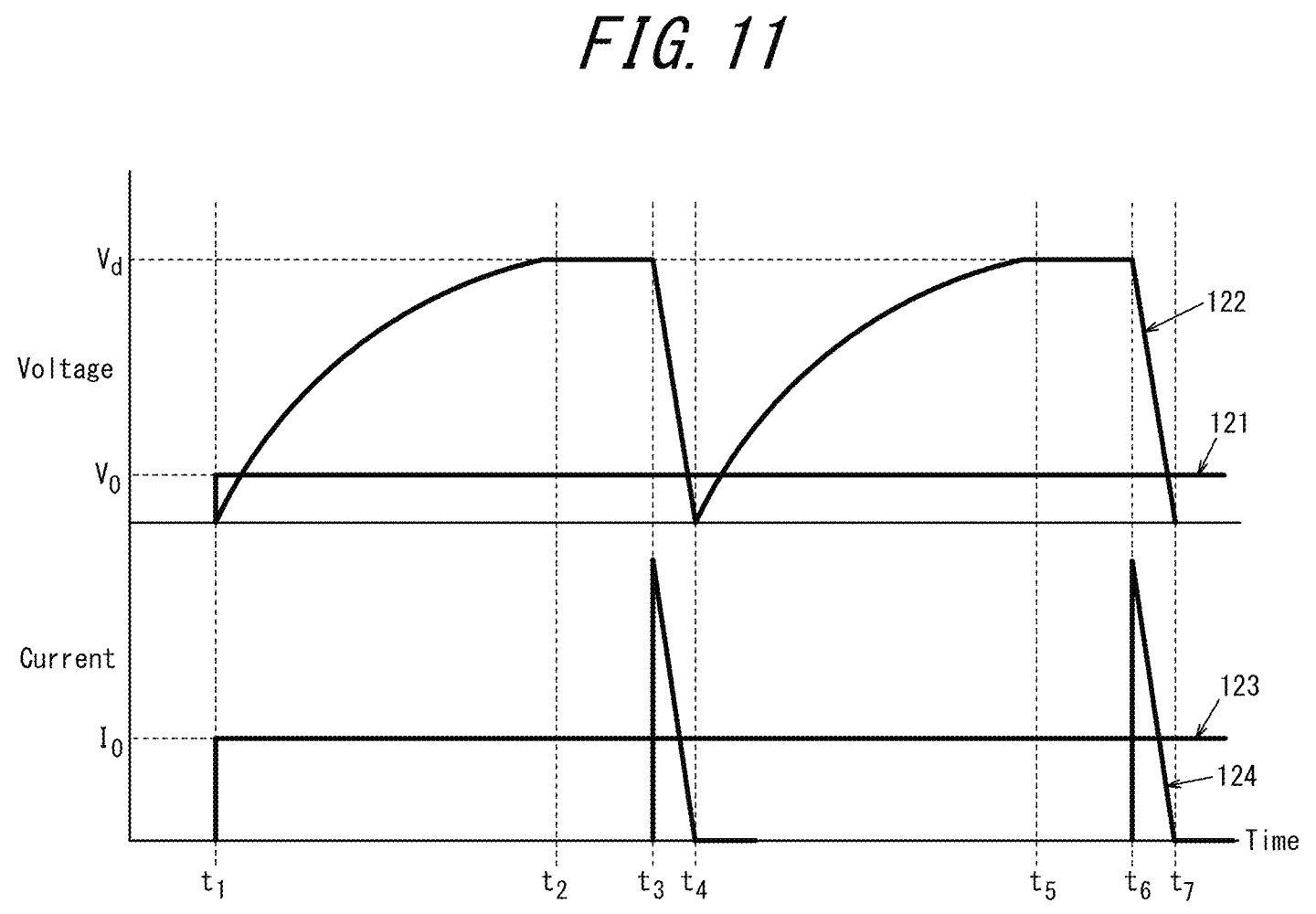

An example is described in which the power source 10 intermittently generates electrical power and the interface circuitry 20 boosts the voltage in response to intermittent power supply from the power source 10, but the power source 10 may continuously generate constant electrical power. Operations of comparative examples and the interface circuitry 20 according to the present embodiment when the power source 10 continuously generates constant electrical power are described with reference to FIG. 9 through FIG. 11. FIG. 9 and FIG. 10 are diagrams schematically illustrating voltage and current output over time by boost circuitry according to the comparative examples. FIG. 11 is a diagram schematically illustrating voltage and current output over time by the interface circuitry 20 according to the present embodiment.

FIG. 9 illustrates operation of a charge pump type of boost circuitry where switching the connection state of capacitors between parallel and series is performed regularly according to a clock signal with a fixed period, as in the configuration described in PTL 1. The boost circuitry according to the comparative example boosts the voltage by storing a charge and switching capacitors connected in parallel to series. The boost circuitry according to the comparative example resumes charging before the charge stored in the capacitors is completely discharged and output voltage becomes zero, in order that the output voltage remains stable.

In the example in FIG. 9, the power source 10 outputs a constant voltage 101 at value $V_0$ and a constant current 103 at value $I_0$. The boost circuitry according to the comparative example outputs a voltage 102 and a current 104. The boost circuitry according to the comparative example charges during time $t_1$ to time $t_2$ and discharges during time $t_2$ to time $t_3$. Subsequently, the boost circuitry according to the comparative example repeats charging and discharging at a fixed period. In the example illustrated in FIG. 9, the boost circuitry according to the comparative example charges during time $t_3$ to time $t_4$ and discharges during time $t_4$ to time $t_5$. The boost circuitry according to the comparative example charges during time $t_5$ to time $t_6$ and discharges during time $t_6$ to time $t_7$. The boost circuitry according to the comparative example repeats such charging and discharging after time $t_7$. In the example illustrated in FIG. 9, output voltage of the boost circuitry at a timing when discharge is started is $V_b$, and output voltage of the boost circuitry at a timing when charging is started is $V_a$ ($V_a > V_b > V_0$). Thus, the boost circuitry according to the comparative example boosts the input voltage $V_0$ from the power source 10 to the voltage $V_b$ to $V_a$. As illustrated in FIG. 9, the boost circuitry according to the comparative example outputs a pulsed current 104 during the periods when discharge from the capacitor is performed (time $t_2$ to time $t_3$, time $t_4$ to time $t_5$, time $t_6$ to time $t_7$, . . . ).

FIG. 10 illustrates operation of boost circuitry according to a voltage conversion method using a transformer, for example. The power source 10 is outputting a constant voltage 111 at value $V_0$ and a constant current 113 at value $I_0$ from time $t_1$. The boost circuitry according to the comparative example outputs a constant voltage 112 at value $V_c$ and a constant current 114 at value $I_c$ from time $t_1$. Assuming electrical power loss in the transformer is zero, then ideally $V_c \times I_c = V_0 \times I_0$. In reality, however, electrical power loss is observed in transformer circuits, and output current of boost circuitry using a transformer may be a fraction to a tenth of the ideal output current value. For example, in a case of boosting the power source 10 that generates 0.1 V and 10 mA, then when output voltage is increased 100 times to 10 V, ideally, output current should be 0.1 mA, which is $\frac{1}{100}$ of 10 mA. However, actual output current of the boost circuitry may be 0.05 mA or less. Conversion efficiency is known to be low, especially when the power source 10 is a micro power source, such as one based on ambient power generation. Therefore, output voltage of boost circuitry using a transformer may be increased to an ideal value, but output current is typically much smaller than an ideal value.

FIG. 11 illustrates operation of the interface circuitry 20 according to the present embodiment in a case of a continuous supply of constant electrical power. The power source 10 is outputting a constant voltage 121 at value $V_0$ and a constant current 123 at value $I_0$ from time $t_1$. The interface circuitry 20 outputs voltage 122 and current 124. The interface circuitry 20 stores charge in the capacitors 43, 45 in response to electrical power supply from the power source 10. The voltage detector 47 measures the charge rate or the like of the capacitor 43, and upon detecting that the charge rate of the capacitor 43 is a predetermined threshold value (first threshold value) or more, the voltage detector executes a control to connect the switch 44 and cause the capacitors 43, 45 to connect in series and discharge. The first threshold value may be, for example, a charge rate value close to 100%, or a voltage across terminals or a charge amount or the like corresponding to the charge rate value. In the example in FIG. 11, the voltage detector 47 controls the switch 44 to connect in response to the voltage across the terminals of the capacitor 43 reaching $V_d$. The interface circuitry 20 charges during the period from time $t_1$ to time $t_2$ and discharges during the period from time $t_3$ to time $t_4$ after a time lag from time $t_2$ to time $t_3$.

After discharge, the voltage detector 47 measures the charge rate or the like of the capacitor 43, and upon detecting that the charge rate of the capacitor 43 is less than a predetermined threshold value (second threshold value), the voltage detector 47 executes a control to disconnect the switch 44 and cause the capacitors 43, 45 to connect in parallel and charge. In the example in FIG. 11, the voltage detector 47 controls the switch 44 to disconnect in response to the voltage across the terminals of the capacitor 43 dropping to zero. Subsequently, the interface circuitry 20 repeats charging and discharging. In the example in FIG. 11, the interface circuitry 20 charges during the period from time $t_4$ to time $t_5$ and discharges during the period from time $t_6$ to time $t_7$ after a time lag from time $t_5$ to time $t_6$. The interface circuitry 20 repeats such charging and discharging after time $t_7$. The time lag from time $t_2$ to time $t_3$ and from time $t_5$ to time $t_6$ may be designed to be zero.

Thus, the interface circuitry 20 repeats the operation of charging the capacitors 43, 45 until the charge rate of the capacitors 43, 45 is almost 100%, outputting charge, then resuming charging when the charge rate of the capacitors 43, 45 is almost 0%. Specifically, the interface circuitry 20 boosts the input voltage $V_0$ from the power source 10 to the voltage $V_d$ in a pulsed manner. As illustrated in FIG. 11, the interface circuitry 20 outputs the pulsed current 124 during the periods when the capacitors 43, 45 are discharged (time $t_3$ to time $t_4$, time to $t_6$ time $t_7$, . . . ). Thus, unlike the comparative examples (FIG. 9 and FIG. 10), which output a nearly regular voltage, the interface circuitry 20 outputs a pulsed output for both current and voltage electrical signals via the output 49 (49a, 49b). Accordingly, the interface circuitry 20 according to the present disclosure is capable of drawing a large charge at one time. In the interface circuitry 20, the switching interval between the parallel and series connection state of the capacitors 43, 45 is long, which allows electrical power loss due to switching of the connection state to be reduced.

In the boost system 1, the load 70 may operate based on electrical power in response to a pulsed electrical power signal output from the interface circuitry 20. For example, the load 70 may operate each time the interface circuitry 20 outputs a single boosted pulsed electrical power signal. In such a case, the operating interval of the 70 load is approximately the same as the interval at which the pulsed electrical power signal is output from the interface circuitry 20. In this way, the load 70 operates in response to the output of a pulsed electrical power signal from the interface circuitry 20, thereby reducing power loss in the storage element 60.

As illustrated in FIG. 11, when the amount of electrical power per unit time generated by the power source 10 is constant, charge is accumulated in the capacitors 43, 45 at a constant rate, and therefore the interval between pulsed electrical signals (current and voltage signals) output by the interface circuitry 20 is constant. As mentioned above, the switching of the connection state of the capacitors 43, 45 between series and parallel is done with respect to the first threshold value and the second threshold value. Therefore, when the load 70 operates each time a single pulsed electrical power signal is output from the interface circuitry 20, the time interval at which the load 70 operates is determined by the amount of electrical power generated per unit time by the power source 10, the first threshold value, and the second threshold value. Therefore, the first threshold value and the second threshold value may be set according to the amount of electrical power generated per unit of time by the power source 10. That is, the first threshold value and the second threshold value may be values determined based on an amount of charge input by the electrical signal input from the input 48 (48a, 48b) and a preset time interval of switching the switch 44. Accordingly, a time interval at which the interface circuitry 20 outputs pulsed electrical signals, and thus the time interval for the operation of the load 70, may be set to a desired value. Even when the electrical power generated by the power source 10 is not strictly constant, when the amount of electrical power generated over a certain period of time (for example, one hour, one day, or the like) is approximately constant, appropriate setting of the first threshold value and the second threshold value means that the operating interval of the load 70 may be approximately set to a desired value.

In the interface circuitry 20, only one switching of the connection state of the capacitors 43, 45 is required to output a single pulsed electrical signal. Therefore, the interface circuitry 20 can significantly reduce power loss associated with switching the connection state of the capacitors 43, 45 compared to the charge pump type of boost circuitry of a comparative example that performs switching at a fixed period, and the interface circuitry 20 is able to efficiently utilize generated electrical power. For example, consider a case where the load 70 is an LED lamp and the LED lamp is illuminated every two seconds. In such a case, in the charge pump type of boost circuitry according to a comparative example that operates with a 100 KHz clock signal, the capacitor connection needs to be switched 200,000 times whenever the LED lamp is turned on. In contrast, in the interface circuitry 20 according to the present embodiment, the number of times to switch the connection state of the capacitors 43, 45 each time the LED lamp is turned on may be only one time. Therefore, the interface circuitry 20 according to the present embodiment can significantly reduce power loss associated with switching the connection state of the capacitors 43, 45, and is able to efficiently utilize electrical power generated by the power source 10.

The foregoing description is only illustrative of an embodiment of the present disclosure, and various changes may of course be made within the scope of the claims. For example, multiple blocks illustrated in a block diagram may be integrated, or one block may be split. Other changes are possible without departing from the spirit of the present disclosure.

INDUSTRIAL APPLICABILITY

According to the present disclosure, input electrical power may be used more efficiently to boost voltage.

REFERENCE SIGNS LIST

1 boost system
10 power source
11 voltage supply
12 resistor
19 output
20 interface circuitry
30 primary boost circuit
31 oscillator
32 rectifier
33 transformer
34 transistor
35 capacitor
36, 37 diodes
38 input
39 output
40 secondary boost circuit
41 diode
42 resistor
43 capacitor
44 switch
45 capacitor
46 resistor
47 voltage detector
48 input
49 output
50 stabilizer circuit

51 regulator
58 input
59 output
60 storage element
70 load

The invention claimed is:

1. Boost circuitry comprising: an input configured to input an electrical signal; capacitors connected in parallel configured to store charge pertaining to the electrical signal inputted; at least one switch capable of switching a connection state of the capacitors; a controller configured to control the at least one switch to switch the connection state of the capacitors from parallel to series based on an amount of charge of any one of the capacitors; and an output configured to output a boosted electrical signal in response to the connection state of the capacitors being switched from parallel to series, wherein the controller is configured to control the at least one switch to switch the connection state of the capacitors from parallel to series in response to voltage between plates of any one of the capacitors reaching or exceeding a predetermined first threshold value.

2. The boost circuitry according to claim 1, wherein the output is configured to output a pulsed electrical signal as the boosted electrical signal.

3. The boost circuitry according to claim 1, wherein the controller is configured to, when the capacitors are connected in series, control the at least one switch to switch the connection state of the capacitors from series to parallel in response to the voltage between plates of any one of the capacitors becoming less than a predetermined second threshold value that is smaller than the first threshold value.

4. The boost circuitry according to claim 3, wherein the first threshold value and the second threshold value are values determined based on an amount of charge input by the electrical signal input from the input and a desired time interval of switching the at least one switch.

5. The boost circuitry according to claim 1, further comprising a boost circuit provided before the capacitors and configured to boost the electrical signal input.

6. The boost circuitry according to claim 1, further comprising resistors connected in series to the capacitors.

7. The boost circuitry according to claim 6, wherein the capacitors and the resistors are connected in parallel to input terminals for an electrical signal input from an electrical power generation element; and the resistors have resistance values selected based on an I-V curve characteristic of the electrical power generation element.

8. A boost system comprising:

an electrical power generation element configured for ambient power generation;

the boost circuitry according to claim 1;

a storage element configured to store electrical power generated by the electrical power generation element and boosted by the boost circuitry; and a load configured to operate based on electrical power stored in the storage element.

9. The boost system according to claim 8, wherein the load is configured to operate based on a boosted pulsed electrical signal in response to output of the boosted pulsed electrical signal from the boost circuitry due to the controller switching the connection state of the capacitors from parallel to series.

* * * * *